United States Patent [19]

Peck

[11] 4,049,909
[45] Sept. 20, 1977

[54] DIGITAL MODULATOR

[75] Inventor: Richard John Peck, Eatontown, N.J.

[73] Assignee: Bell Telephone Laboratories, Incorporated, Murray Hill, N.J.

[21] Appl. No.: 626,657

[22] Filed: Oct. 29, 1975

[51] Int. Cl.$^2$ .......................................... H04L 27/24
[52] U.S. Cl. .................................... 178/67; 325/45; 325/145
[58] Field of Search ................. 178/67; 325/38 B, 30, 325/145, 163, 45; 179/15 AF

[56] References Cited

U.S. PATENT DOCUMENTS

| | | | |
|---|---|---|---|
| 3,128,342 | 4/1964 | Baker | 178/66 |
| 3,128,343 | 4/1964 | Baker | 178/67 |
| 3,597,599 | 8/1971 | Melvin | 178/67 |
| 3,611,143 | 10/1971 | Van Gerwen | 325/38 |
| 3,747,024 | 7/1973 | Choquet | 325/38 B |
| 3,818,135 | 6/1974 | Tannhauser | 178/67 |
| 3,935,386 | 1/1976 | Glasson | 178/67 |

Primary Examiner—Benedict V. Safourek
Assistant Examiner—Michael A. Masinick
Attorney, Agent, or Firm—Joseph P. Kearns

[57] ABSTRACT

A modulator for differentially encoded phase-shift keyed digital data is implemented entirely by digital means. Baseband serial binary data are illustratively transformed into dibit pairs which are assigned discrete quaternary carrier-wave phase shifts. A "staircasing" shift register whose weighted outputs are combined to form a quantized phase-modulated carrier wave is advanced by a relatively high-speed counter through a frequency divider network. The division rate of the divider is selectively accelerated in each baud interval in accordance with the assigned dibit coding. The resultant quantized carrier wave is then lowpass filtered prior to application to a telephone transmission line. By controlling the division rate of the divider rather than the advancement rate of the shift register, gradual transitions are imparted to the output carrier wave with minimal harmonic distortion.

7 Claims, 4 Drawing Figures

DIGITAL MODULATOR

FIELD OF THE INVENTION

This invention relates to differentially encoded phase-shift keyed modulation of a carrier wave by digital data; and, in particular, to the application of digital techniques to differentially encoded phase modulation in a data transmission system.

CROSS REFERENCE TO RELATED APPLICATIONS

This application is related to two U.S. patent applications by R. J. Peck Ser. No. 626,658 entitled "Digital Timing Recovery", and S. Y. Tong Ser. No. 626,659 "Digital Demodulator" both filed of even date herewith.

BACKGROUND OF THE INVENTION

Phase modulation of binary digital data is a basic modulation technique employed in medium-speed data transmission systems employing voiceband transmission channels. Differentially coherent phase-shift-keyed (PSK) modulation, in particular, is widely utilized because no reference carrier wave need be transmitted, thus conserving bandwidth and minimizing error propagation. Data are coded by means of changes in phase rather than by absolute phases. When two discrete phases are selected for encoding, e.g., 0° and 180°, binary data are transmitted bit by bit. With four equally spaced discrete phases, e.g., 0°, ±90° and 180°, two bits of data are transmitted in each baud interval. With eight discrete phases, e.g., the integral multiples of 45°, three bits of data can similarly be encoded on each allowed phase. Increases in numbers of bits per baud interval are eventually limited by noise characteristics of the transmission channel.

Known techniques for differential PSK modulation of digital data have included making available continuously all the allowable phases in analog form and keying the correct phase to the line as required by the phase encoding; counting down from a high-speed binary counter and controlling the advance or retardation in the frequency-division ratio in accordance with the phase encoding; and exciting ringing oscillations alternately at predetermined phases of a common frequency in accordance with the data encoding and interleaving the ringing oscillations under the control of a sinusoidal envelope to suppress transients arising at phase transitions.

It is an object of this invention to simplify and improve the countdown technique for differential phase-shift-keyed modulation of binary data signals.

It is a further object of this invention to embody a modulator for differential PSK data in relatively simple digital network configurations.

SUMMARY OF THE INVENTION

In accordance with this invention the frequency-divided output of a relatively high-speed clock is applied to a multistage shift register whose weighted parallel outputs are combined to form a quantized PSK carrier wave. The relative phase of the quantized carrier wave is periodically changed by discrete amounts in accordance with a digital data signal to be differentially encoded thereon by selectively accelerating the frequency-division rate. Operating on the frequency-division rate instead of forcibly stuffing the shift register with the next-required carrier phase or accelerating the shift-register advancement rate avoids abrupt transitions in the phase of the quantized carrier wave and simplifies the output filtering. The continuous quantized and weighted output of the shift register is finally passed through a simple, low-pass filter for smoothing purposes.

In an illustrative embodiment for a four-phase differentially encoded PSK data transmission system four discrete multiples of 90° are employed to encode binary digits in dibit pairs, i.e., taken two at a time. Each of the four possible dibit pairs 00, 01, 11 and 10 are encoded respectively as integral ($n = 0, 1, 2$ and 3 ) multiples of 90° electrical degrees. The dibits are further arranged in reflected Gray order, rather than in pure binary order, to minimize encoding errors.

Assuming a clock frequency eight times the desired carrier-wave frequency, a frequency division ratio of eight is required. If this ratio is implemented with three divider stages in tandem, each dividing by two, two additional pulses added to the imput of the first (highest count input) stage, or one added to the second intermediate stage, produce an output phase advance of 90°. Accordingly, 0, 2, 4 or 6 additional pulses introduced into the input of the first stage produces phase advances equal respectively to 0°, 90°, 180° and 270°. Similarly, 0, 1, 2 or 3 pulses introduced into the second stage of the three-stage divider produce these same output phase shifts. A simple logic converter responsive to data pairs supplies these additional counts to the frequency divider. A simple three-stage shift register driven by the frequency divider and continuously advanced at eight times the carrier frequency provides three successive carrier-wave samples for weighted combining into a quantized wave with a sinusoidal envelope.

For higher data rates the basic structure can be scaled up to handle eight-phase or higher rate operation in a straightforward manner.

DESCRIPTION OF THE DRAWING

The above and other objects of this invention can be appreciated from a consideration of the following detailed description and the drawing in which.

DETAILED DESCRIPTION OF AN ILLUSTRATIVE EMBODIMENT

Figure 1:
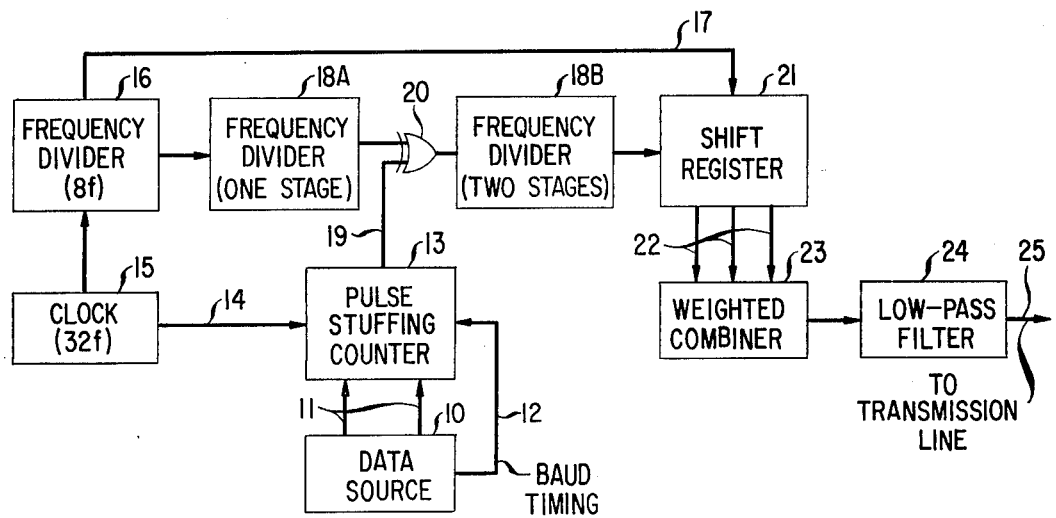
FIG. 1 is a simplified block diagram of the digital data modulator of this invention.

An exemplary PSK digital data modulator according to this invention, which is applicable to four-phase encoding of data dibits on phase changes between consecutive signaling periods of duration T, is shown in FIG. 1 to comprise a serial binary data source 10 providing the parallel dibit elements on output leads 11, pulse stuffing counter 13 for converting the dibits from source 10 to be transmitted into an integral number of counts on lead 19, a fixed-rate clock circuit 15 operating through frequency divider 16 at not less than eight times the intended carrier frequency $f$, frequency divider 18 (shown by way of specific example in two parts 18A and 18B), exclusive-OR-gate 20 for coupling either output pulses from divider 18A or advance counts from counter 13 to frequency divider 18B, shift register 21 driven by divider 18, and clocked by way of lead 17 from divider 16, weighted combiner 23 and low pass filter 24 for delivering a PSK signal to transmission line 25.

Figure 3:
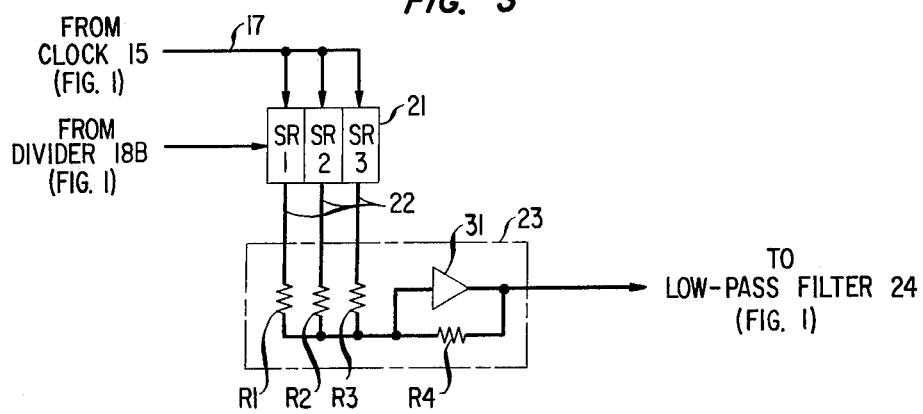
FIG. 3 is a block diagram of a weighted shift register useful in generating a quantized carrier wave.
Figure 4:
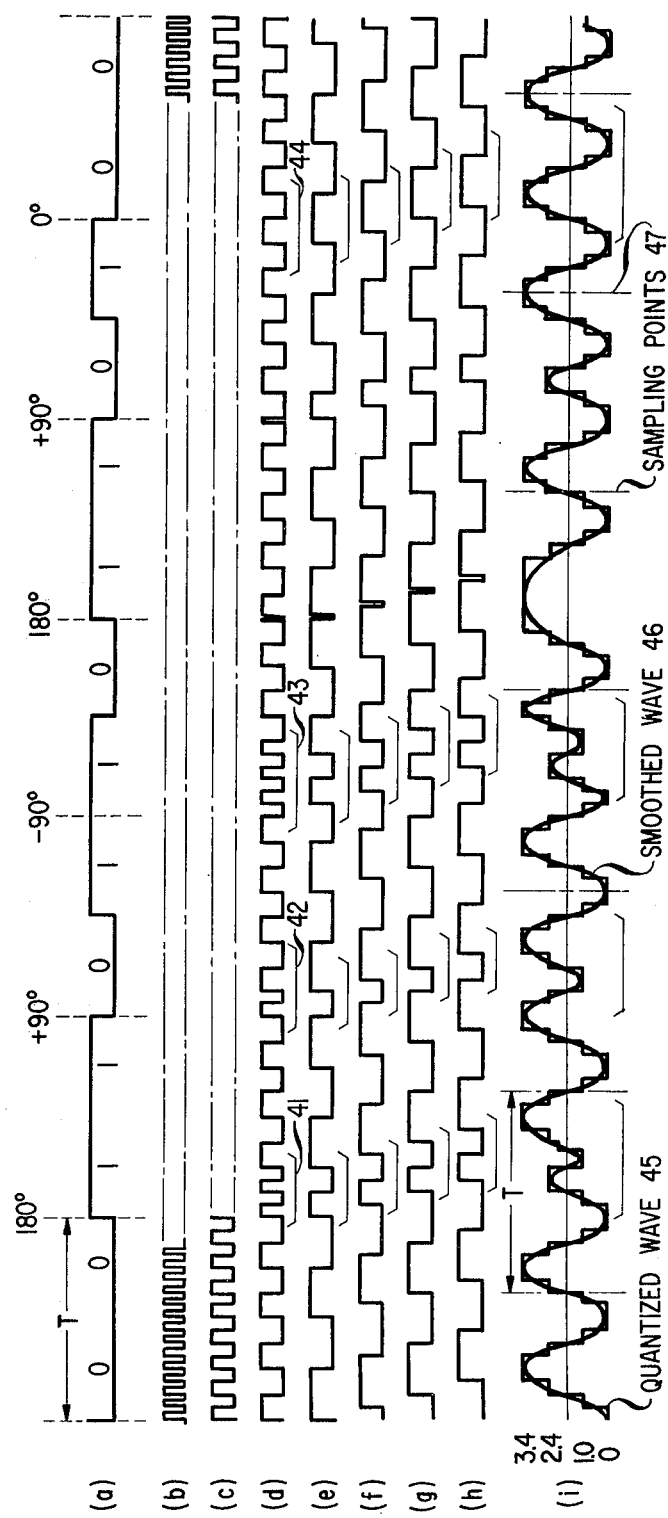
FIG. 4 is a group of waveform diagrams useful in explaining the operation of this invention.

It may be helpful first to understand the operation of shift register 21 and combiner 23 in producing a quantized wave of sinusoidal form. Refer to FIGS. 3 and 4. FIG. 3 shows shift register 21 to have three stages SR1, SR2 and SR3 with the contents of all stages moving to the right for every clock pulse from clock 15 by way of divider 16 and lead 17. Binary samples are admitted at the left into stage SR1 and are sequentially shifted through stages SR2 and SR3 and thereafter lost. The output of divider 18B, as shown on line (e) of FIG. 4 is a square wave at a frequency one-eighth that of the advance frequency on lead 17 (waveform (b) of FIG. 4). Thus, four samples of each half cycle of the square wave output of divider 18 are taken. Three consecutive ones of these samples are available at the outputs of stages SR1, SR2 and SR3 of shift register 21 at any given instant on parallel leads 22.

In weighted combiner 23, shown in FIGS. 1 and 3, are three resistors R1, R2 and R3, with relative values $\sqrt{2}$ (1.414+) and 1, controlling operational amplifier 31 with feedback resistor R4 of a fixed value (conveniently of relative value $\sqrt{2}$) for determining the gain of amplifier 31. Lines (f), (g) and (h) of FIG. 4 indicate the instantaneous values of samples simultaneously available on output leads 22 when the input wave is that shown on line (e). When the respective samples shown on lines (f) and (h) are multiplied by the relative values 1 of the ratio of resistors R1 and R3 to feedback resistor R4 and are added to the samples on line (9) multiplied by a relative value $\sqrt{2}$ (ratio R4 to R2) consecutively, the quantized wave 45 is generated. If the square wave of line (e) were of constant phase, then output wave 45 would be smoothed into a sinusoidal wave.

To be more specific, at the extreme left on lines (f), (g) and (h), each square wave is at 0 level and the weighted summation of the three waves is 0. When the wave on line (f) goes to 1, the waves on lines (g) and (h) remain at 0 and the sums of the three waves becomes 1. When the wave line (g) goes to 1, that on line (f) remains at 1 and that on line (h) remains at 0. The value on line (g) is multiplied by $\sqrt{2}$ relative to that on line (f) and is added to the latter to equal a combined output level of 2.41+. Finally, when the samples on lines (f), (g) and (h) are all at 1, their weighted sum becomes 3.41+. Thus, one quarter of a sine wave is built up in a quantized form suggestive of a staircase on line (i). It is now clear how the entire quantized sine wave is generated from the weighted summation of the outputs of shift register 21.

When the phase of the output wave is to be shifted between signaling intervals, it could be accomplished rapidly by appropriately changing all the samples in shift register 21 at a rate more rapid than the normal shift rate. An abrupt change of this nature, however, generates undesired higher harmonics of the carrier-wave fundamental frequency. These higher harmonics can cause distorting crosstalk into neighboring channels of multichannel transmission systems. These undesirable harmonics can largely be eliminated according to this invention by selectively stuffing additional pulses into the frequency divider 18 of FIG. 1 either at its input or at an intermediate stage. The change in phase from one signaling interval to another is then achieved gradually through a blending of successive phases and higher harmonics are kept at a minimum.

Figure 2:
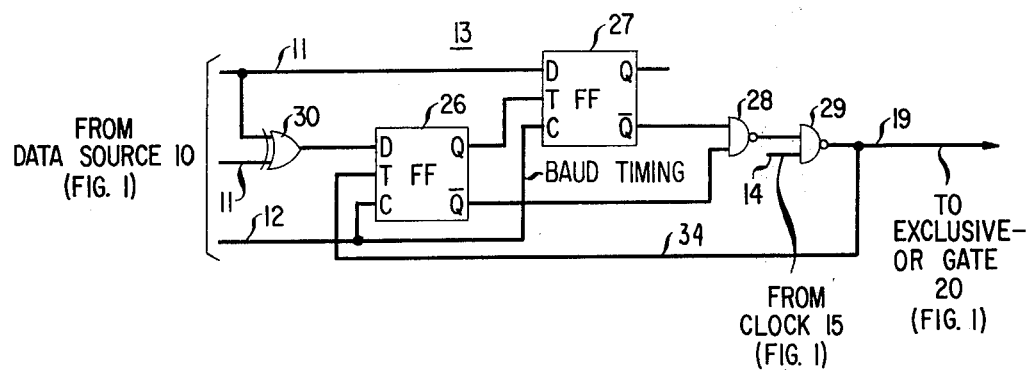
FIG. 2 is a block diagram of a pulse stuffing counter useful in the practice of this invention to determine the degree of advancement of the frequency divider according to the data sequence to be transmitted.

For the purpose of phase change blending between signaling intervals, data bits from source 10 are paired conventionally into dibits on output leads 11 and applied to pulse stuffing counter 13, which is also synchronized with the baud interval T over lead 12. As shown in FIG. 2 pulse stuffing counter 13 in the quaternary (four-phase) case can advantageously comprise tandem-connected flip-flops 26 and 27 having a feedback connection 34, a first NAND gate 28 having as inputs complementary Q outputs of the respective flip-flops 26 and 27, a second NAND gate 29 having as inputs the output of NAND gate 28 and a clock signal, and exclusive-OR gate 30. Each of flip-flops 26 and 27 can be D types with data inputs D, clock inputs C, toggle inputs T and complementary outputs Q and Q.

Dibit inputs on leads 11 (most significant bit on the left) are applied through exclusive-OR gate 30 and directly to inputs D of respective flip-flops 26 and 27 at the baud timing rate 1/T on lead 12 to provide for Gray coding. The Q output of flip-flop 26 drives the T input of flip-flop 27 to provide binary count-up operation. The complementary outputs of flip-flops 26 and 27 are combined in NAND gate 28 to provide a clock enable signal to NAND gate 29 which in turn provides advance counts on lead 19 to frequency divider section 18B through exclusive-OR gate 20. The advance counts are fed back over lead 34 to the T input of flip-flop 26.

A convenient dibit phase encoding in Gray form is 0° for dibit 00, +90° for dibit 01, 180° for dibit 11 and −90° for dibit 10. If the phase shifts are to be made at the intermediate divider stage as shown in FIG. 1, the corresponding advance counts are 0, 1, 2 and 3 respectively. When the dibit 00, for example is applied to the D inputs of counter 13 (FIG. 2), no change in Q output states occurs at the baud timing instant. When the dibit 01 is applied, the Q states of flip-flops 26 and 27 are complemented and NAND gate 28 passes an additional clock pulse, which by feedback path 34 recomplements the flip-flops to their rest states. A 90° phase change thereby occurs. When the dibit 11 is applied through exclusive-OR gate 29 to flip-flops 26 and 27, flip-flop 26 remains the same and flip-flop 27 is complemented, thereby causing NAND gate 28 to change state and emit a first count followed by one other as the two flip-flops are restored to their rest states. A −180° phase change results. When the dibit 10 is applied, flip-flop 26 is complemented while flip-flop 27 is unchanged. The three counts fed back over lead 34 return the flip-flops to their rest states and the phase is advanced by 270 (−90°).

The effect of introducing these additional counts is illustrated in the waveforms of FIG. 4. Line (a) shows a representative serial data wave to be transmitted. The wave is divided into dibits of duration T separated by vertical broken-line segments. 0 bits are represented by low states and 1 bits, by high states. Angular notations above the broken lines indicate the phase coding corresponding to the dibit next to be transmitted. Lines (b) and (c) show respectively the 8f clock wave from frequency divider 16 and that wave after the first halving in frequency-divider section 18A. Lines (d) and (e) represent the outputs of the respective first and second stages of section 18B of the frequency divider. Lines (f) through (i) have been discussed previously. Line (d) in particular shows in bracketed locations 41, 42, 43 and 44

(which are expanded on the time scale for illustrative purposes by a factor of 16) how the extra counts from pulse stuffing counter 13 effect the desired phase encoding charges for the respective dibits 11, 01, 10 and 00. The advance counts are injected in the preferred embodiment at a $32f$ rate determined by clock 15. The resultant phase changes are carried down into line (i) on which the quantized and smoothed output waves are shown as waves 45 and 46, respectively. The vertical broken lines on line (i), spaced by signaling interval T mark the sampling points 47 between which the encoding phase changes are to be measured. It is clear, for example, that the phase difference between the two leftmost sampling points is 180° inasmuch as the left transition is a positive-going zero crossing and the next sampled transition is a negative-going zero crossing.

The frequency divider 18 in FIG. 1 is shown as having two sections 18A and 18B with the phase-advancing counts injected between sections. It is readily apparent that the phase-advancing counts can equivalently be injected at the input of section 18A, provided only that twice as many pulses are employed, as would be required were the pulses to be injected at the input of section 18B. Furthermore, a single pulse at the input of the output stage of section 18B causes a 180° phase change. Therefore, single pulses supplied substantially simultaneously to the inputs of the input and output stages in section 18B of the countdown means cause a 270° phase change.

While this invention has been described by way of a particular illustrative embodiment, many modifications will occur to those skilled in the art within the spirit and scope of the appended claims.

What is claimed is:

1. A modulator for differentially phase-encoded digital data comprising
    multistage binary countdown means having an input wave oscillating at an integral multiple of a desired carrier frequency and an output wave at said carrier frequency,
    multistage shift-register means driven by said output wave and shifted by said input wave from said countdown means,
    weighting means for combining a plurality of successive parallel outputs of said shift register means into quantized line signals at the desired carrier frequency, and
    count inserting means responsive to the digital data for inserting extra counts into one or more preselected stages of said countdown means in accordance with a predetermined phase-shift data encoding.

2. The modulator defined in claim 1 in which said data are encoded in pairs on four preselected phase changes which are integral multiples of 90 electrical degrees, the frequency of the input wave for said countdown means is eight times said desired carrier frequency, said multistage countdown means and shift-register means each has three stages, phase changes of 90, 180 and 270 electrical degrees are effected by inserting 1, 2 and 3 additional pulses into said countdown means between the first and second stages thereof and said weighting means provide weights to successive samples of the output of said countdown means in the ratio of square root of two to unity.

3. A modulator for differentially phase-encoded digital data comprising
    multistage binary countdown means having an input wave oscillating at an integral multiple of a desired carrier frequency and an output wave at said carrier frequency,
    multistage shift-register means driven by said output wave and shifted by said input wave from said countdown means,
    weighting means for combining a plurality of successive parallel outputs of said shift register means into quantized line signals at the desired carrier frequency, and
    count inserting means responsive to the digital data for inserting extra counts into one or more stages of said countdown means in accordance with a predetermined phase-shift data encoding further comprising
    a pair of tandem-connected flip-flop devices,
    means for presetting the output stages thereof in accordance with the desired data encoding and
    feedback means causing the output states of said flip-flop means to change in sequence until a predetermined rest state is attained.

4. A modulator for differentially encoded phase-shift-keyed digital data comprising
    a fixed timing source having a pulsed output at least eight times the frequency of a carrier wave for said digital data,
    countdown means responsive to the pulsed output of said timing source for providing said carrier wave,
    shift-register means driven by said countdown means to provide a plurality of time-spaced output waves,
    combining means including preselected weighting means for at least three of the time-spaced output waves from said shift-register means for forming a quantized phase-modulated carrier wave, said weighting means being proportioned to synthesize a wave of sinusoidal form,
    a source of digital data having as output data pairs, and
    a pulse-stuffing counter responsive to the output data pairs from said digital data source for selectively inserting extra counts into said countdown means to advance the phase of the carrier-wave output thereof in accordance with a preassigned data encoding.

5. The modulator defined in claim 4 in which data are encoded as phase changes between signaling intervals of 0, 90, 180 and 270 electrical degrees corresponding to dibit pairs 00, 01, 11 and 10, where 0 indicates a spacing bit and 1 indicates a marking bit.

6. The modulator defined in claim 4 in which said pulse-stuffing counter counts at a rate higher than and different from that of said countdown means.

7. A modulator for differentially encoded phase-shift-keyed digital data comprising
    a fixed timing source having a pulsed output at least eight times the frequency of a carrier wave for said digital data,
    countdown means responsive to the pulsed output of said timing source for providing said carrier wave,
    shift-register means driven by said countdown means to provide a plurality of time-spaced output waves,
    combining means including preselected weighting means for at least three of the time-spaced output waves from said shift-register means for forming a quantized phase-modulated carrier wave, said weighting means being proportioned to synthesize a wave of sinusoidal form, a source of digital data having as output data pairs, and a pulse-stuffing counter responsive to the output data pairs from said digital data source for selectively inserting extra counts into said countdown means to advance the phase of the carrier-wave output thereof, in accordance with a preassigned data encoding further comprising a pair of bistable flip-flop circuits connected in tandem, and a coincidence gate having as inputs an output from each of said flip-flop circuits and an output connected to the toggling input of one of said flip-flop circuits for forming with said pair of flip-flop circuits an interruptible counter whose maximun count is determined by the input states of said flip-flop circuits.

* * * * *